Nov. 24, 1942.  H. J. INGALLS  2,303,049
GEARSHIFT INDICATOR
Filed June 18, 1940  2 Sheets-Sheet 1
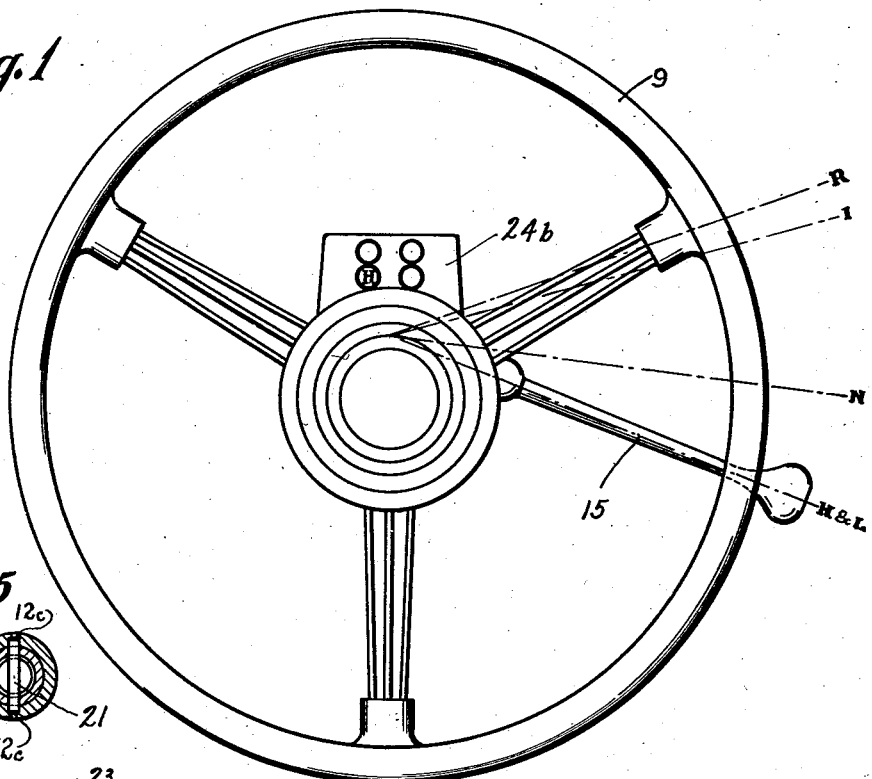
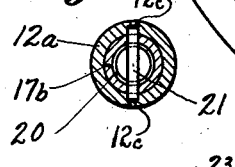
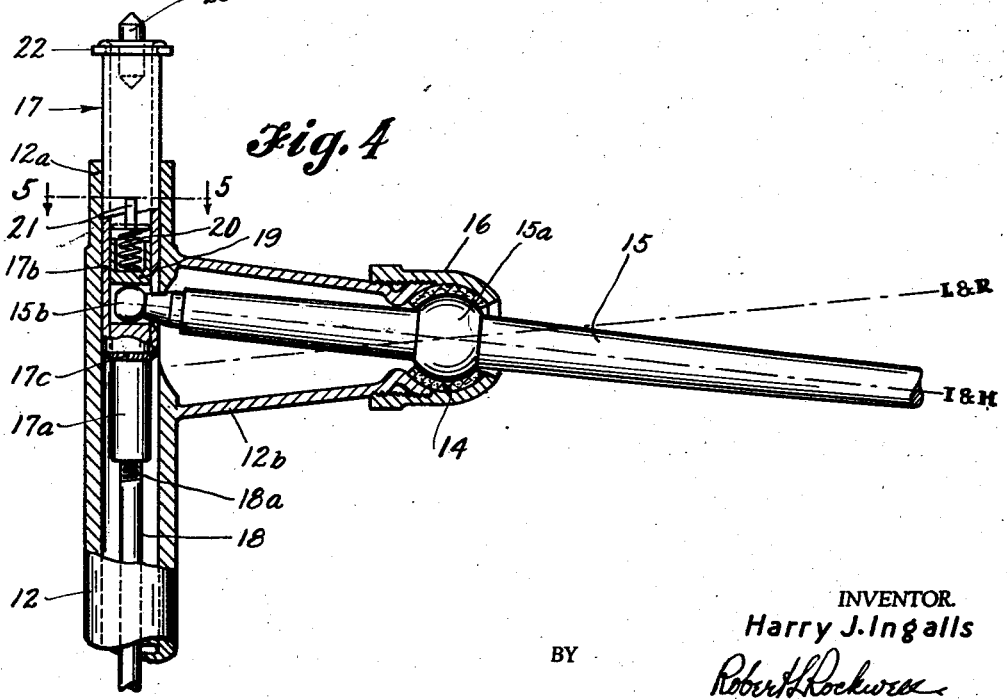
INVENTOR.
Harry J. Ingalls
BY Robert L. Rockwell
ATTORNEY.

Nov. 24, 1942.    H. J. INGALLS    2,303,049
GEARSHIFT INDICATOR
Filed June 18, 1940    2 Sheets-Sheet 2
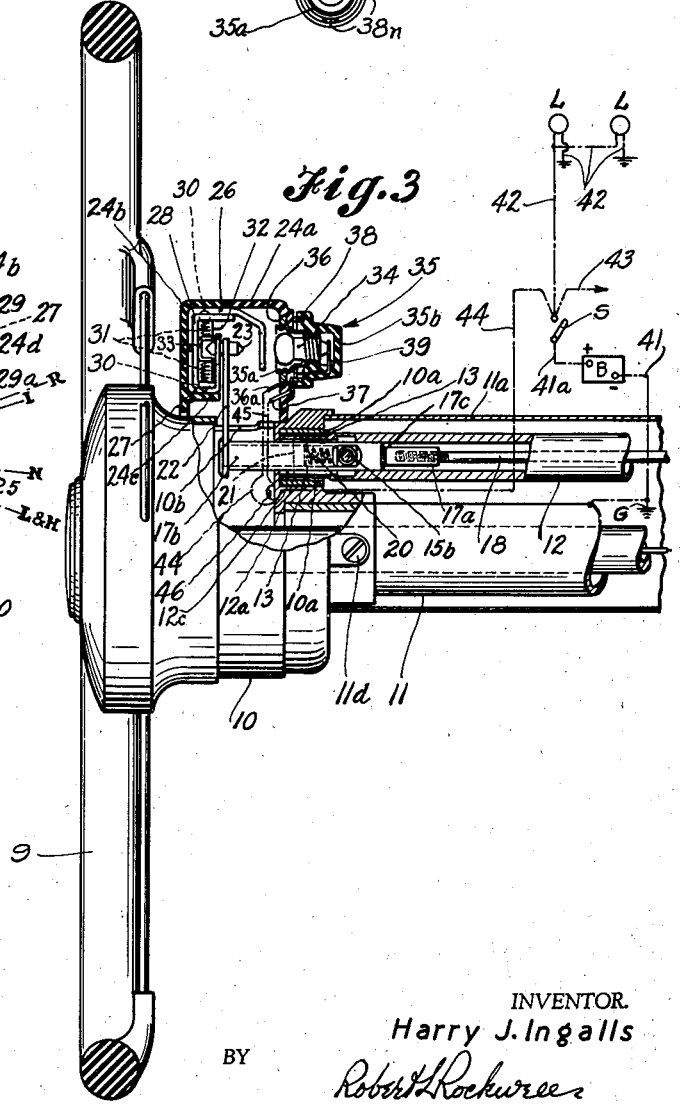
INVENTOR.
Harry J. Ingalls
BY Robert L Rockwell
ATTORNEY.

Patented Nov. 24, 1942

2,303,049

UNITED STATES PATENT OFFICE 2,303,049

GEARSHIFT INDICATOR

Harry J. Ingalls, Ferncliff, Wash.

Application June 18, 1940, Serial No. 341,157

5 Claims. (Cl. 116—124)

This invention relates to indicator devices for automotive equipment in general, and in particular to means for indicating the position of the transmission gears thereof when the gear-shift lever is mounted on the steering column.

Experienced drivers who are accustomed to using gear-shift levers that project upwardly through the floor of the vehicle, often become confused when driving cars having their gear-shift levers mounted on the steering column, and this confusion may result in much embarrassment and, under certain conditions, serious accidents. Inexperienced drivers have even more difficulty, particularly while learning to drive.

The accompanying drawings illustrate a preferred form of the invention that is adapted for use in connection with a certain much-used make of automotive equipment by attaching it to the direction signal housing at the upper end of the steering column directly below the steering wheel. The invention is applicable by means of certain obvious modifications, however, for use in connection with any other gear-shift mechanism in which the shifting lever is moved up and down axially of the steering column while in its neutral position to select the transmission gear that then is to be engaged by turning the said lever laterally in one direction or the other from said neutral position.

An object of my invention is to provide improved means of the kind described for indicating the setting of the gears in the well known transmission unit of the vehicle without the use of artificial light by day, and by the aid of an electric light that is turned on automatically whenever the other lights of the vehicle are lit.

Another object is to provide an improved indicator of the kind described wherein the indicator opening for each setting of said transmission gears is fully disclosed only when the gears for said setting are fully engaged.

A further object is to provide a device of the kind described that is simple and rugged in construction, inexpensive to manufacture and easy to install.

Other objects and advantages will be apparent to those skilled in the art from the aforesaid preferred form of the invention, which consists of certain parts and combination of parts hereinafter described, illustrated in the accompanying drawings and embraced in the appended claims.

In the drawings:

Figure 1 is a plan view of the steering-wheel end of a steering column to a smaller scale than the other figures of the drawings, with my gear-shift indicator attached and with the gear-shift lever in the high-speed position;

Figure 2 is a plan view showing said indicator attached to the direction signal housing, with the steering wheel and direction signal switch removed;

Figure 3 is a side view of the upper end of the steering column with the steering wheel in place and the gear-shift indicator parts in medial sectional elevation, together with a diagram of the electrical connections for the indicator lamp;

Figure 3a is a plan view of my special lamp socket removed from the indicator housing;

Figure 4 is a medial sectional elevation of the selector mechanism elements and gear-shift lever removed from the steering column to a larger scale.

Figure 5 is a transverse section taken on broken line 5—5 of Figure 4;

Figure 6 is a plan view of the upper shutter element of the indicator, and Figure 6a is a sectional elevation thereof taken on broken line 6a—6a of Figure 6;

Figure 7 is a plan view of the lower shutter element of the indicator, and Figure 7a is a sectional elevation thereof taken on broken line 7a—7a of Figure 7;

Figure 8 is a plan view of the guide element for said shutter elements, and Figure 8a is an end elevation of the same.

Characters of reference are used to indicate like parts throughout the several views of the drawings, wherein the numeral 9 indicates the steering wheel comprising hub, arms and rim. 10 is the direction signal housing, which is fixedly secured to the upper end of steering column tube 11 by means of screw 11d.

Housing 10 usually is made of die-casting metal which is rather soft, so a steel bearing bushing 10a may be fixedly secured in an aperture therein to receive the journal end 12a of tubular gear-shift shaft 12, a sleeve 13 of compressed fabric material being used to prevent rattling. Fixedly secured to said gear-shift shaft is a tubular extension 12b that terminates in an exterior threaded portion and an interior spherically recessed portion adapted to receive the inner portion of compressed fabric spherical bushing 14, which is adjustably compressed upon spherical bearing 15a of gear-shift lever 15 by means of spherically recessed bearing nut 16, as shown clearly in Figure 4. An elliptical sheet metal housing 11a serves to enclose steering column 11 and gear-shift shaft 12 to improve the appearance of the assembly.

Gear selector socket element 17 is slidable axially inside of the upper end of tubular gear-shift shaft 12. Said socket element may be made of a lower cylindrical portion 17a, tapped to receive the threaded end 18a of gear selector rod 18, to which a tubular upper portion 17b may be fixedly secured as by welding at 17c. Spherical end 15b of the gear-shift lever is resiliently held against the upper end of portion 17a by means of slider cup 19 and compression spring 20, which in turn bears against notched key bar 21 inserted in diametrically opposite slots in tubular portion 17b, as shown in Figures 3, 4 and 5. Because of the increased diameter of the upper end turns of spring 20 the notch in said key bar assures the proper projection thereof to form two diametrically opposite key portions that slide in a pair of interior keyways 12c, as shown in Figures 3 and 5. Part 17 and the several other parts assembled therewith I term the gear selector element.

Arm 22 is fixedly secured to the upper end of tubular portion 17b and projects through notch 10b in the side wall of housing 10 into the interior of the gear-shift indicator, as shown in Figures 2 and 3. The outer end of arm 22 carries pin 23, which is tapered at its ends to facilitate its engagement with the indicator shutters, as hereinafter explained.

The housing for the gear-shift indicator parts may be made in two parts 24a and 24b of moulded plastic, such as Bakelite. The lower part 24a of said housing may be removably secured to housing 10 by means of screws 25, as shown in Figure 2. The upper part 24b may be removably secured to part 24a by means of suitable screws 29a, which facilitate the removal thereof for inspection and repairs.

Housing part 24a is provided with a transverse rib 24c, which provides a pocket in which shutter elements 26 and 27 may slide. Guide member 28 retains these shutters in position when secured in position against ledges 24d at the ends of said pocket by means of screws 29. Said ledges are slightly higher than the thickness of the slides, and the width of guide member 28 is slightly less than the width of said pocket less the thickness of the two shutters. There is, therefore, sufficient clearance between guide member 28 and housing part 24b so elements 26 and 27 may be slid back and forth freely. L, R, H and I are window apertures in housing part 24b through which the corresponding letters may be seen only when the transmission gears are set for low, reverse, high and intermediate, respectively, as hereinafter explained.

In order to assure said elements 26 and 27 being in their proper normal positions for engagement with pin 23 of shutter shifting arm 22, apertures 28b are provided in the flange portions of guide member 28 in line with recesses 30a in each shutter, so balls 30 may be forced into said recesses by springs 31 whenever said shutter elements are returned to their said normal positions, as shown in Figure 2. Flanged U-shaped pieces 32 may be spot welded to said guide member to hold said balls and springs in position laterally, and another U-shaped piece 33 likewise may be spot welded thereto for the springs to thrust against, as shown in Figures 3 and 8. Balls 30 thus serve as resiliently held latch means for retaining said shutters in their respective said normal positions until actuated by arm 22 and pin 23; they also prevent the shutters from rattling.

An electric light 34 may be screwed into removable socket 35 when the same is removed by unscrewing it from threaded metal ring 36, having metal connection terminal 36a, which, with contact spring 37, may be moulded into the base portion 24a of the Bakelite indicator housing.

Socket 35 comprises threaded shell 35a and ring 38 having appended contact spring 39, all of metal, which may be moulded in position in Bakelite body 35b, as shown clearly in Figure 3. The exposed edge of ring 38 may have a plurality of shallow notches 38n slightly wider than the width of contact spring 37.

After screwing the metal base of lamp 34 into socket shell 35a, so the contact button of the lamp engages contact spring 39, the larger outer threaded portion of socket shell 35a may be screwed into threaded ring 36 until spring 37 engages one of the notches 38n of ring 38, thus providing the necessary electrical connections and at the same time preventing the accidental unscrewing of the socket from the indicator housing. The sides of the aforesaid notches may be tapered slightly so contact spring 37 may leave the notch when sufficient force is applied to unscrew the socket.

Referring to the diagram of electrical connections in Figure 3, it will be seen that the storage battery B of the vehicle is "grounded" to the frame of the vehicle by conductor 41 to which steering column 11 and housing 10 are therefore electrically connected, as indicated at G.

Whenever switch S controlling the lights of the vehicle is closed, current flows through the conductor 41a and the closed switch to the upper terminal thereof, thence through conductors 42 to the frame to light headlights L; through conductor 43 to light other lights; and through conductor 44, terminal 36a, ring 36, shell 35a, lamp 34, spring 39, ring 38, spring 37 and conductor 45 connected to housing 10 by means of screw 46, to light lamp 34 of my gear-shift indicator.

All of the walls and parts within the housing space below guide member 28 preferably are covered with white paint or other reflecting material to prevent excessive absorption of the light from said lamp.

Four apertures 28a are provided in the face of guide number 28 into which indicator signs, or indicia, preferably in the form of transparency disks 40 of Celluloid or the like, may be inserted and glued in position. Said transparencies may have opaque letters printed thereon, as shown in Figure 8.

The mode of operation of the device is as follows:

When gear-shift lever is shifted laterally to position N of Fig. 1, arm 22 is in position N of Fig. 2, and said lever then is movable to either the L and R or the I and H gear selector position of Fig. 4. If released in said position N, said lever is returned to, or held in, its lower I and H gear selector position by means of the upward thrust on the lower end of rod 18 by a spring, not shown, and arm 22 and pin 23 then are in the position shown in Fig. 3.

Said lever 15 may be raised against the force of said spring to its upper L and R gear selector position for shifting the transmission gears either into low L or reverse R only while in said lateral neutral position N of Fig. 1. When said lever is so raised arm 22 is lowered and the lower portion of pin 23 enters slot 26s of shutter 26, as will be understood by referring to Figs. 4 and 3.

With lever 15 so raised, if the driver selects for engagement the low speed forward gear, he shifts said lever in a clockwise direction to position L of Fig. 1. This causes arm 22 to move shutter 26 to the right, thereby fully uncovering all of the L window of Fig. 2 and exposing all of transparency disk L of Fig. 8 to view.

By next shifting lever 15 to said neutral position N, lowering it to said lower I and H gear selector position and then shifting it in a counter-clockwise direction to position I of Fig. 1, the intermediate speed gears are engaged; and this in turn causes arm 22 to return shutter 26 to its neutral position (thus covering the L window), withdraw pin 23 from slot 26s, insert it in slot 27s and then move shutter 27 to the left, respectively, thereby uncovering the I window of Fig. 2 and exposing the I disk of Fig. 8 to view.

Likewise, shifting lever 15 while in said lower I and H gear selector position from position I to position H of Fig. 1, disengages the intermediate speed gears and engages the high speed gears; and also moves arm 22 and shutter 27 from their extreme left to extreme right positions, thereby closing said I window and opening the H window to expose the H disk to view, as shown in Fig. 1.

Returning lever 15 to neutral N, moving it to its upper L and R gear selector position and then shifting in a counter-clockwise direction to position R of Fig. 1, disengages the high speed gears and engages the reverse gears; and also causes arm 22 to return shutter 27 to its neutral position (thus closing the H window), withdraw pin 23 from slot 27s and insert it in slot 26s, and then move shutter 26 to the left, respectively, thereby opening the R window and exposing the R disk to view.

When none of the four windows of the indicator are open, it indicates that lever 15 and the transmission gears are in neutral. It will be apparent from the drawings and the foregoing description that the lengths and neutral positions of the two shutters are such that if the shift is made for any of the three speeds forward and reverse, the corresponding window is opened fully only when the gears for that speed are fully engaged, whereupon the lettered disk of the indicator may be seen in its entirety.

During the day the large letters on disks 40 are plainly visible whenever exposed to view by the movements of the shutters. At night when the car lights are turned on, the light from lamp 34 shines through the exposed said disks and shows clearly both the indicator letter corresponding to the engagement of certain gears and also the degree of their engagement by the amount of the circular window allowed to be illuminated by the corresponding position of the slide.

From the foregoing it will be apparent to those skilled in the art that my invention may be adapted to indicate the setting of transmission gears wherever the gear-shift lever is movable to a plurality of neutral selector positions, in each of which it then is movable to one or more gear engagement positions.

Having disclosed my invention, what I claim as new and desire to protect by Letters Patent is:

1. In a device adapted to be mounted upon the steering column of an automotive vehicle and to indicate the position of an adjacent steering-column type of gear-shift lever having a lateral neutral position in which it is movable to a plurality of gear selector positions from one of which it then may be shifted to a predetermined one gear engagement position, the combination of a housing fixedly secured to said steering column and comprising an indicator window so positioned therein as to be associated with said gear engagement position, a shutter slidably supported within said housing and adapted to cover said window when in its normal position corresponding to the said neutral position of said gear-shift lever, an indicator sign fixedly supported within said housing opposite said window and behind said shutter, a gear selector element adapted to be actuated axially by said gear-shift lever when in its said lateral neutral position, means fixedly secured to said gear selector element for operatively engaging said shutter when said lever is moved to said one gear selector position and for then moving said shutter to uncover said window and expose said indicator sign to view when said lever is shifted to said one gear engagement position.

2. In a device adapted to be mounted upon the steering column of an automotive vehicle and to indicate the position of an adjacent steering-column type of gear-shift lever having a lateral neutral position in which it is movable to a plurality of gear selector positions from one of which it then may be shifted to a predetermined one gear engagement position, the combination of a housing fixedly secured to said steering column and comprising an indicator window so positioned therein as to be associated with said gear engagement position, a shutter slidably supported within said housing and adapted to cover said window when in its normal position corresponding to the said neutral position of said gear-shift lever, spring actuated latch means adapted to resiliently retain said shutter in said normal position, an indicator sign fixedly supported within said housing opposite said window and behind said shutter, a gear selector element adapted to be actuated axially by said gear-shift lever when in its said lateral neutral position, means fixedly secured to said gear selector element for operatively engaging said shutter when said lever is moved to said one gear selector position and for then moving said shutter to uncover said window and expose said indicator sign to view when said lever is shifted to said one gear engagement position.

3. In a device adapted to be mounted upon the steering column of an automotive vehicle and to indicate the position of an adjacent steering-column type of gear-shift lever having a lateral neutral position in which it is movable to a plurality of gear selector positions from one of which it then may be shifted to a predetermined one gear engagement position, the combination of a housing fixedly secured to said steering column and comprising an indicator window so positioned therein as to be associated with said gear engagement position, a shutter slidably supported within said housing and adapted to cover said window when in its normal position corresponding to the said neutral position of said gear-shift lever, an indicator transparency fixedly supported within said housing opposite said window and behind said shutter, a gear selector element adapted to be actuated axially by said gear-shift lever when in its lateral neutral position, an arm fixedly secured to said gear selector element for operatively engaging said shutter when said lever is moved to said one gear selector position and for then moving said shutter to fully uncover said window and expose all of said indicator transparency to view only when said lever is shifted fully to said one gear engagement position, and a source of light for illuminating said indicator transparency from the rear.

4. In a device adapted to be mounted upon the steering column of an automotive vehicle and to indicate the position of an adjacent steering-column type of gear-shift lever having a lateral neutral position in which it is movable to a plurality of gear selector positions from one of which it then may be shifted in one direction to low gear engagement position and in the opposite direction to reverse gear engagement position, the combination of a housing fixedly secured to said steering column and comprising an indicator window associated with said low gear engagement position and another window associated with said reverse gear engagement position, a shutter slidably supported within said housing and adapted to cover both said windows when in its normal position, resiliently held latch means adapted to retain said shutter in said normal position, indicia opposite each said window fixedly supported within said housing behind said shutter, a gear selector element adapted to be actuated axially by said gear-shift lever when in its lateral neutral position, an arm fixedly secured to said gear selector element for operatively engaging said shutter when said lever is moved to said one gear selector position and for then moving said shutter to uncover only the said window associated therewith when said lever is shifted to said low gear engagement position and for moving said shutter in the opposite direction to uncover only the other said associated window when said lever is shifted in the opposite direction to said reverse gear engagement position.

5. In a device adapted to be mounted upon the steering column of an automotive vehicle and to indicate the position of an adjacent steering-column type of gear-shift lever having a lateral neutral position in which it is movable to a plurality of gear selector positions from one of which it then may be shifted in one direction to intermediate gear engagement position and in the opposite direction to high gear engagement position, the combination of a housing fixedly secured to said steering column and comprising a pair of spaced apart indicator windows in one wall thereof, a guide member in spaced apart relation to the inner side of said wall fixedly secured at its ends to said housing and comprising an aperture opposite each said window, an indicia in each said aperture of said guide member, a shutter slidable in the space between said wall and guide member and adapted to cover both said windows when in its normal position, resiliently held latch means adapted to retain said shutter in said normal position, a gear selector element adapted to be actuated axially by said gear-shift lever when in its lateral neutral position, an arm fixedly secured to said gear selector element for operatively engaging said shutter when said lever is moved to said intermediate gear selector position and for then moving said shutter to uncover only one said window when said lever is shifted to said intermediate gear engagement position and for moving said shutter in the opposite direction to uncover only the other said window when said lever is shifted in the opposite direction to said high gear engagement position.

HARRY J. INGALLS.